(12) United States Patent
Annan et al.

(10) Patent No.: US 9,005,745 B2
(45) Date of Patent: Apr. 14, 2015

(54) POROUS CARBON-CONTAINING COMPOUNDS AS WATER CARRIERS AND CELL SIZE CONTROLLING AGENTS FOR POLYMERIC FOAMS

(71) Applicant: Owens Corning Intellectual Capital LLC, Toledo, OH (US)

(72) Inventors: Nikoi Annan, Newark, OH (US); Roland R Loh, Stow, OH (US); Rebecca E Cochran, New Albany, OH (US); Yadollah Delaviz, Lewis Center, OH (US); S Thomas Brammer, Kent, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 123 days.

(21) Appl. No.: 13/685,887

(22) Filed: Nov. 27, 2012

(65) Prior Publication Data
US 2014/0162047 A1    Jun. 12, 2014

Related U.S. Application Data

(62) Division of application No. 12/492,293, filed on Jun. 26, 2009, now abandoned.

(51) Int. Cl.
*B32B 5/22* (2006.01)
*C08L 25/06* (2006.01)
(Continued)

(52) U.S. Cl.
CPC ........... *C08L 25/06* (2013.01); *C08J 9/125* (2013.01); *C08J 2203/06* (2013.01);
(Continued)

(58) Field of Classification Search
USPC ........... 428/314.4, 314.8, 317.9; 521/79, 146
See application file for complete search history.

(56) References Cited

U.S. PATENT DOCUMENTS

| 4,229,396 A | 10/1980 | Suh et al. |
| 5,373,026 A | 12/1994 | Bartz et al. |

(Continued)

FOREIGN PATENT DOCUMENTS

| EP | 887167 | 12/1998 |
| EP | 1465941 | 10/2004 |

(Continued)

OTHER PUBLICATIONS

International Search Report and Written Opinion from PCT/US10/039897 dated Sep. 6, 2010.
(Continued)

*Primary Examiner* — Hai Vo
(74) *Attorney, Agent, or Firm* — Calfee, Halter & Griswold LLP

(57) ABSTRACT

Polymeric foam and polymeric foam products that contain a foamable polymer material, at least one blowing agent, activated carbon, and water are provided. The activated carbon acts as both a water absorbent and carrier for the water. The activated carbon is able to control and increase cell size even in the presence of carbon dioxide, HFCs, and/or infrared attenuating agents. Additionally, the activated carbon permits a desired amount of water to be introduced into the polymer melt. By controlling the amount of activated carbon and its water content during an extrusion process, a broad range of cell sizes can be obtained in the extruded product. In exemplary embodiments, the activated carbon is added to a primary extruder and water is directly injected into a secondary extruder. Alternatively, the activated carbon is compounded with a polymer resin, pre-hydrated by conditioning or steam impregnation, and added to a primary or secondary extruder.

15 Claims, 3 Drawing Sheets

(51) Int. Cl.
*C08J 9/12* (2006.01)
*C08K 3/04* (2006.01)

(52) U.S. Cl.
CPC ....... *C08J 2203/10* (2013.01); *C08J 2205/046* (2013.01); *C08J 2205/052* (2013.01); *C08J 2325/04* (2013.01); *C08J 9/122* (2013.01); *C08K 3/04* (2013.01)

(56) References Cited

U.S. PATENT DOCUMENTS

| | | | |
|---|---|---|---|
| 5,475,035 | A | 12/1995 | Park et al. |
| 5,489,407 | A | 2/1996 | Suh et al. |
| 8,507,568 | B2 * | 8/2013 | Lee et al. .................. 521/53 |
| 2008/0293839 | A1 | 11/2008 | Stobby |
| 2009/0117358 | A1 * | 5/2009 | Kruper et al. ............ 428/219 |

FOREIGN PATENT DOCUMENTS

| | | |
|---|---|---|
| EP | 1988119 | 11/2005 |
| GB | 1138473 | 1/1969 |
| JP | 2004189868 | 7/2004 |
| KR | 1020060012705 | 2/2006 |
| WO | 2009/148445 | 12/2009 |

OTHER PUBLICATIONS

Office action from U.S. Appl. No. 12/492,293 dated Jun. 9, 2011.
Office action from U.S. Appl. No. 12/492,293 dated Oct. 27, 2011.
Office action from U.S. Appl. No. 12/492,293 dated Feb. 29, 2012.
Office action from U.S. Appl. No. 12/492,293 dated Jul. 27, 2012.
Interview Summary and Notice of Abandonment from U.S. Appl. No. 12/492,293 dated Feb. 5, 2013.
Office action from Chinese Application No. 201080034165.0 dated Jan. 21, 2013.
Office action from Chinese Application No. 201310202441.5 dated Nov. 25, 2014.
Search Report from European Application No. 14170848.7 dated Jul. 10, 2014.

* cited by examiner

POROUS CARBON-CONTAINING COMPOUNDS AS WATER CARRIERS AND CELL SIZE CONTROLLING AGENTS FOR POLYMERIC FOAMS

This application is a divisional application of U.S. patent application Ser. No. 12/492,293, filed Jun. 26, 2009, now abandoned.

TECHNICAL FIELD AND INDUSTRIAL APPLICABILITY OF THE INVENTION

The present invention relates generally to extruded foam products, and more particularly, to extruded polymeric foams containing a porous carbon-containing compound such as activated carbon as a water absorbent and carrier to control cell size and improve physical properties of the extruded foam product. Methods of forming such polymer foams are also provided.

BACKGROUND OF THE INVENTION

Foamed resinous structures are useful in a wide variety of applications such as thermal insulation, in cushions, as packaging, and as adsorbents. Extruded foams are generally made by melting a polymer together with any desired additives to create a polymer melt. A blowing agent is mixed with the polymer melt at an appropriate temperature and pressure to produce a foamable gel mixture. The foamable gel mixture is then cooled and extruded into a zone of reduced pressure, which results in a foaming of the gel and the formation of the desired extruded foam product. As will be appreciated, the relative quantities of the polymer(s), blowing agent(s), and additives, as well as the temperature and manner in which the pressure is reduced will tend to affect the qualities and properties of the resulting foam product.

Traditional blowing agents used for extruded foam products include chlorofluorocarbons (CFCs) and hydrochlorofluorocarbons (HCFCs). One of the advantages of both CFC and HCFC blowing agents is their high solubility in a polymer melt during the manufacturing process. Higher blowing agent solubility promotes a reduction in viscosity when the blowing agent is mixed with the polymer melt. In turn, lower viscosity leads to lower energy requirements for mixing. On the other hand, a major disadvantage to these traditional blowing agents is that an increasing number of governments worldwide have mandated the elimination of CFC and HCFC blowing agents due to growing environmental concerns. CFCs, and many other halocarbons, have come to be recognized as serious global environmental threats due to their ability to cause stratospheric ozone depletion and global warming. The ozone depletion and global warming impact of chemicals such as CFCs and HCFCs are measured by the ozone depletion potential (ODP) and global warming potential (GWP) respectively.

In view of the mandatory phase out of blowing agents with a high ODP and a high GWP, there has been a movement to replace the conventional blowing agents with more environmentally friendly blowing agents, such as hydrofluorocarbons (HFCs) and $CO_2$, in insulating foam applications. Although HCFCs provide a superior thermal barrier compared to HFC and $CO_2$, the chlorine present in the HCFCs possesses an ozone depletion potential. Additionally, over time, the chlorofluorocarbon gas phase remaining in the foam is released into the atmosphere, thereby reducing the insulative value of the foam and potentially further contributing to the global warming potential. In addition, each of the "non-conventional" blowing agents leads to a different cell size and morphology, depending on the particular blowing agent chosen. Additionally, the cell sizes of the foams produced by these generally environmentally friendly blowing agents are too small to provide an acceptable insulative value to the foamed product and generally results in a higher density and a more costly product. For instance, HFC-134a is much less soluble in a polystyrene melt than HCFC-142b. A, HFC-134a produces foams with a small cell size, which creates difficulty in processing compared to HCFC-142b.

Attempts have been made in the art to enlarge the cell size while utilizing a non-HCFC blowing agent and maintaining an environmentally friendly product. Non-limiting examples of such attempts are set forth below.

U.S. Pat. No. 4,229,396 to Suh, et al. teaches extruded synthetic resinous foams having an increased cell size when volatile fluid blowing agents are used by incorporating a cell-size enlarging agent into the extruded composition. The cell-size enlarging agent is an organic compound that is liquid at the foaming temperature and atmospheric pressure and generally soluble in the gel at the foaming temperature. In addition, Sub teaches that the cell-size enlarging agent melts below the foaming temperature of the foamable composition. Examples of cell-size enlarging agents include natural and synthetic waxes. It is asserted that foams prepared according to the disclosed method are more dimensionally stable than similar foams prepare without a cell-size enlarging agent.

U.S. Pat. No. 5,489,407 to Suh et al. describes a process for making a closed-cell, alkenyl aromatic polymer foam that has an enlarged cell size. The polymer is preferably polystyrene. For environmental reasons, the blowing agent is preferably an inorganic blowing agents such as $CO_2$, nitrogen, argon, water, helium, or air. The composition used to form the foam includes a substantially non-waxy cell size enlarging agent. The composition may optionally contain a nucleating agent (e.g., inorganic substances such as talc, clay, and/or calcium carbonate) to control the size of the foam cells.

U.S. Pat. No. 5,475,035 and EP 0887167 to Park disclose processes that incorporate a first blowing agent into the polymer melt at a higher temperature and water as a second blowing agent at a lower temperature. The first blowing agent is substantially free of water, and includes inorganic blowing agents, organic blowing agents, and chemical blowing agents. The water is introduced downstream of the first blowing agent. Park teaches that by incorporating the water downstream of the first blowing agent, corrosion in the process equipment is minimized. In addition, a nucleating agent (e.g., inorganic substances such as talc, clay, and/or calcium carbonate) may be added to the melt to control the cell size of the foamed material.

U.S. Patent Publication No. 2008/0293839 to Stobby teaches the use of water and, preferably, at least one blowing agent selected from hydrocarbons, hydrofluorocarbons, and fluorocarbons as the blowing agent. The blowing agent may be incorporated or mixed into the polymer melt at an elevated pressure sufficient to prevent substantial expansion of the melt polymer material and to generally disperse the blowing agent in the polymer melt. It is asserted that the use of water allows for lower process pressures, lower foam density, and larger cell sizes while remaining environmentally friendly.

One problem with the use of water as a blowing agent is that it can cause corrosion in the process equipment. This problem is exacerbated when a brominated aliphatic fire retardant is utilized. For instance, the water may combine with hydrogen bromide (HBr) or other decomposition products of the brominated aliphatic fire retardants to form a polymer melt that has a high acid content. In turn, the acid within the polymer melt corrodes the hardware in the extrusion equipment. Because of the corrosion to the extruder and associated extruding equipment, parts must be frequently repaired or replaced, resulting in increased manufacturing costs and increased downtime.

Despite previous attempts to increase the cell size while using water as a blowing agent and reduce corrosion, there remains a need in the art to achieve an extruded polymer foam that has an increased cell size when non-HCFC blowing agents are used, that maintains the positive physical properties of conventional extruded polystyrene foams, and that reduces or eliminates corrosion of the extruder.

SUMMARY OF THE INVENTION

It is an object of the present invention to provide a method of forming a rigid, closed cell foam product that includes (1) heating at least one alkenyl aromatic polymer material and a non-encapsulated porous carbon-containing compound to a first temperature sufficient to melt the at least one polymer material and form a polymer melt, (2) injecting one or more blowing agent into the polymer melt to form a foamable gel material, (3) conveying the foamable gel to a second extruder where the foamable gel is cooled to a second temperature, where the second temperature is lower than the first temperature, (4) injecting a liquid that evaporates, decomposes, or reacts under the influence of heat to form a gas directly into the second extruder and into the polymer melt, where the liquid is absorbed by the non-encapsulated porous carbon-containing compound, and (5) extruding the cooled foamable gel through a die at a pressure sufficient to form a rigid, closed cell foam product. The method may further include compounding said activated carbon with said at least one alkenyl aromatic polymer material to form a compounded material and then adding the compounded material to the first extruder.

The porous carbon-containing compound may be activated carbon, powdered activated carbon, coconut shell, wood, husk, husk powder, carbon black, porous granite, and combinations thereof. The liquid may be liquid water, hydrocarbons, halogenated hydrocarbons, alcohols, dihydric alcohols, polyhydric alcohols, ketones, esters, ethers, amides, acids, aldehydes, and mixtures thereof. In exemplary embodiments, the liquid is water and the water is injected into the secondary extruder prior to the extrusion die. In addition, the water may be treated with at least one member selected from surfactants, neutralizers, corrosion inhibitors, and chemical blowing agents. The porous carbon-containing compound may be activated carbon having an average particle size from about 1 to about 100 microns. Additionally, the activated carbon may have an impregnated water content from about 0.2% to about 2.0% based on the total weight of the polymer material. The alkenyl aromatic polymer material and the activated carbon may be added sequentially to the primary extruder, with the activated carbon being directly fed into the primary extruder in a form selected from a powder, a compact form, and a slurry.

It is also an object of the present invention to provide a method of forming a rigid, closed cell foam product that includes (1) heating a first portion of an alkenyl aromatic polymer material to a first temperature sufficient to melt the first portion of the polymer material and form a polymer melt, (2) injecting one or more blowing agent into the polymer melt to form a foamable gel, (3) conveying the foamable gel to a second extruder where the foamable gel is cooled to a second temperature, where the second temperature is lower than the first temperature, (4) adding a hydrated porous carbon-containing compound to the second extruder and into the foamable gel, and (5) extruding the cooled foamable gel through a die at a pressure sufficient to form a rigid, closed cell foam product. The porous carbon-containing compound may be selected from activated carbon, powdered activated carbon, coconut shell, wood, husk, husk powder, carbon black, porous granite, and combinations thereof. The porous carbon-containing compound may be a non-encapsulated activated carbon.

In at least one exemplary embodiment, the method includes forming the hydrated porous carbon-containing compound by compounding a second portion of the alkenyl aromatic polymer material with the porous carbon-containing compound to form a porous carbon-containing compound/polymer resin compound and then placing the porous carbon-containing compound/polymer resin compound into a conditioning room where the porous carbon-containing compound absorbs water from the air to form the hydrated porous carbon-containing compound. The hydrated porous carbon-containing compound has a desired amount of hydration. In such an embodiment, the porous carbon-containing compound absorbs water over a time period from about 1 to about 3 days.

In another exemplary embodiment, the method further includes forming the hydrated porous carbon-containing compound by (1) compounding a second portion of the polymer material with the porous carbon-containing compound to form a porous carbon-containing compound/polymer resin compound, (2) placing the porous carbon-containing compound/polymer resin compound into a pressurized container, and (3) treating the porous carbon-containing compound/polymer resin compound with steam to form the hydrated porous carbon-containing compound, where the hydrated porous carbon-containing compound has a desired amount of hydration. In this embodiment, the porous carbon-containing compound absorbs water in a time period of less than about 10 minutes.

It is a further object of the present invention to provide a pre-hydrated porous carbon-containing compound for carrying water into an extruder in an extrusion process for forming a rigid, polymer foam that includes a porous carbon-containing compound compounded with at least one alkenyl aromatic polymer material, where the porous carbon-containing compound has a desired amount of hydration. The porous carbon-containing compound may be selected from activated carbon, powdered activated carbon, coconut shell, wood, husk, husk powder, carbon black, porous granite, and combinations thereof. In one exemplary embodiment, the porous carbon-containing carbon is hydrated under pressure through steam impregnation. In another embodiment of the invention, the porous carbon-containing compound is hydrated in a conditioning room having a controlled temperature and controlled humidity. In at least one exemplary embodiment, the porous carbon-containing compound is a non-encapsulated activated carbon.

It is an advantage of the present invention that the foamable composition provides a desired cell size without affecting the final foam product properties.

It is also an advantage that the foamable composition including activated carbon and water produce foams having a desired cell size.

It is yet another advantage of the invention that directly injecting water into the secondary extruder reduces or eliminates corrosion in the primary extruder.

It is another advantage of the present invention that the inclusion of the activated carbon in the foamable composition requires no modification to existing manufacturing equipment and therefore no increase in manufacturing costs.

It is a further advantage of the present invention that the foams produced by the present composition have no toxicity to living creatures.

It is also an advantage of the present invention that the activated carbon acts as a cell size enlarging agent in the presence of blowing agents such as carbon dioxide and HFCs and infrared attenuating agents such as carbon black, graphite, aluminum flake, and carbon fibers.

It is another feature of the present invention that the amount of activated carbon and water present in the polymer melt can be independently controlled so that a desired amount of water is added to the polymer melt.

It is a feature of the present invention that the foamable polymer material is an alkenyl aromatic polymer material.

It is yet another feature of the present invention that by controlling the amount of activated carbon and its water content during an extrusion process, a broad range of cell sizes can be obtained in the extruded product.

It is a further feature of the present invention that the composition of the present invention has a low global warming potential and little or no ozone depleting potential.

It is another feature of the present invention that the activated carbon can be quickly impregnated with water by steam impregnation.

It is yet another feature of the present invention that the activated carbon can be impregnated by water in a humidity controlled environment over a period of a few days.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
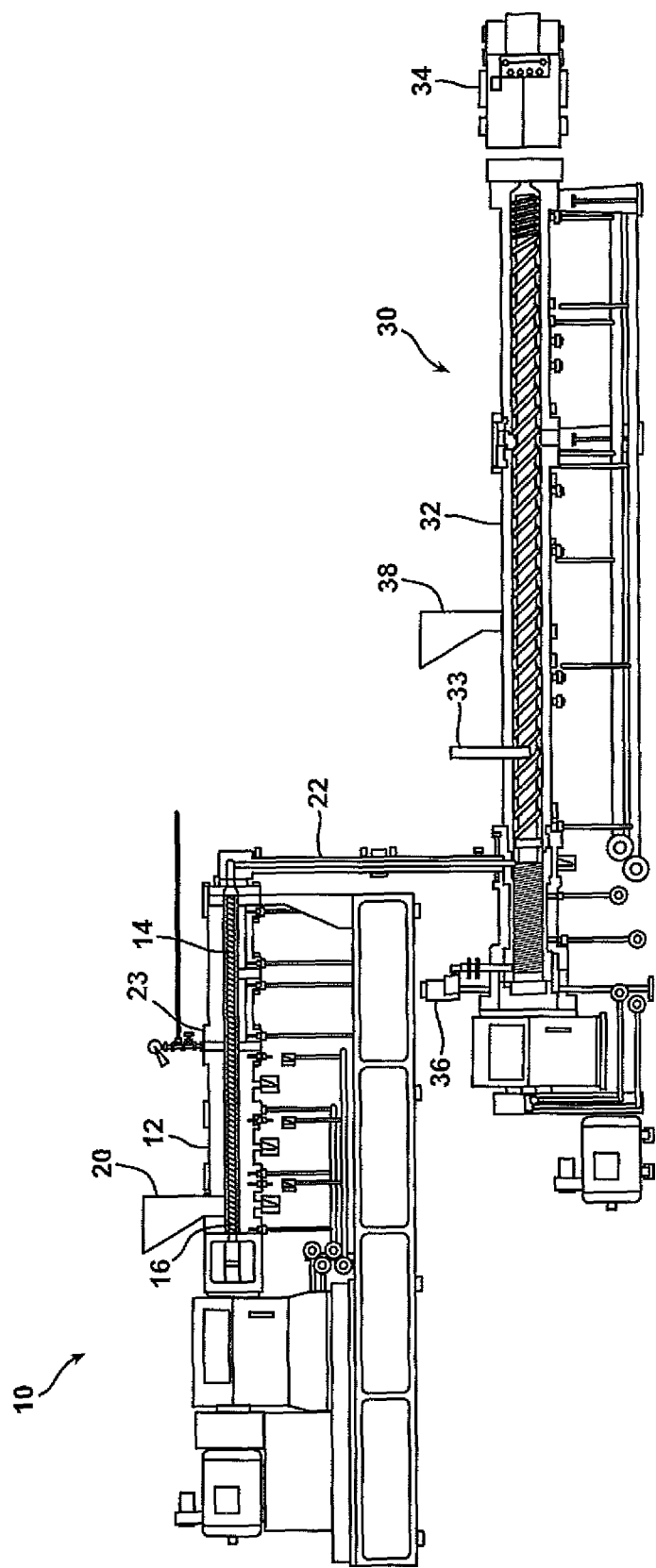
FIG. 1 is a schematic illustration of an extrusion apparatus including a primary extruder and a secondary extruder for forming an extruded foam where the activated carbon is added to the primary extruder and the water is added to the secondary extruder according to exemplary embodiments of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements. The terms "composition" and "inventive composition" may be used interchangeably herein. It is to be appreciated that as used herein, "hydrated" may be used interchangeably with "impregnated" and "pre-hydrated" may be interchangeably used with "pre-impregnated".

The present invention relates to a polymeric foam and polymeric foam products, such as extruded or expanded polystyrene foams, formed from a composition that contains a foamable polymer material, a blowing agent, a porous carbon-containing compound (e.g., activated carbon), and water. The porous carbon-containing compound acts both as a water absorbent and as a carrier for the water. The porous carbon-containing compound permits a desired amount of water to be introduced into the polymer met. By controlling the amount of the porous carbon-containing compound and its water content during the extrusion process, a broad range of cell sizes can be obtained in the extruded product. The inclusion of a porous carbon-containing compound in the polymer melt improves the processability of the polymer melt and the physical properties of the extruded foam products. The porous carbon-containing compound functions as cell size controlling agent, a cell size enlarging agent, a process aid, and an infrared attenuating agent.

The foamable polymer material is the backbone of the formulation and provides strength, flexibility, toughness, and durability to the final product. The foamable polymer material is not particularly limited, and generally, any polymer capable of being foamed may be used as the foamable polymer in the resin mixture. The foamable polymer material may be thermoplastic or thermoset. However, in exemplary embodiments, the polymer material is a thermoplastic resin. The particular polymer material may be selected to provide sufficient mechanical strength and/or to the process utilized to form final foamed polymer products. In addition, the foamable polymer material is preferably chemically stable, i.e., generally non-reactive, within the expected temperature range during formation and subsequent use in a polymeric foam. Non-limiting examples of suitable foamable polymer materials include alkenyl aromatic polymers, polyvinyl chloride (PVC), chlorinated polyvinyl chloride (CPVC), polyethylene, polypropylene, polycarbonates, polyisocyanurates, polyetherimides, polyamides, polyesters, polycarbonates, polymethylmethacrylate, polyurethanes, phenolics, polyolefins, styreneacrylonitrile, acrylonitrile butadiene styrene, styrene/acrylonitrile/methyl methacrylate, acrylic/styrene/acrylonitrile block terpolymer (ASA), polysulfone, polyurethane, polyphenylenesulfide, acetal resins, polyamides, polyaramides, polyimides, polyacrylic acid esters, copolymers of ethylene and propylene, copolymers of styrene and butadiene, copolymers of vinylacetate and ethylene, rubber modified polymers, thermoplastic polymer blends, and combinations thereof.

In one embodiment, the foamable polymer material is an alkenyl aromatic polymer material. Suitable alkenyl aromatic polymer materials include alkenyl aromatic homopolymers and copolymers of alkenyl aromatic compounds and copolymerizable ethylenically unsaturated comonomers. In addition, the alkenyl aromatic polymer material may include minor proportions of non-alkenyl aromatic polymers. The alkenyl aromatic polymer material may be formed of one or more alkenyl aromatic homopolymers, one or more alkenyl aromatic copolymers, a blend of one or more of each of alkenyl aromatic homopolymers and copolymers, or blends thereof with a non-alkenyl aromatic polymer. Notwithstanding the components of the composition, the alkenyl aromatic polymer material may include greater than 50 or greater than 70 weight percent alkenyl aromatic monomeric units. In at least one embodiment of the invention, the alkenyl aromatic polymer material is formed entirely of alkenyl aromatic monomeric units.

Examples of alkenyl aromatic polymers include, but are not limited to, those alkenyl aromatic polymers derived from alkenyl aromatic compounds such as styrene, α-methylstyrene, ethylstyrene, vinyl benzene, vinyl toluene, chlorostyrene, and bromostyrene. In at least one embodiment, the alkenyl aromatic polymer is polystyrene.

Minor amounts of monoethylenically unsaturated compounds such as $C_2$ to $C_6$ alkyl acids and esters, ionomeric derivatives, and $C_2$ to $C_6$ dienes may be copolymerized with alkenyl aromatic compounds. Non-limiting examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

The foamed products may be formed substantially of (e.g., greater than 95 percent), and in most embodiments, formed entirely of polystyrene. Additionally, the polystyrene may be recycled expanded polystyrene. The foamable polymer material may be present in the composition in an amount from about 50% to about 95% by weight, in an amount from about 80% to about 90% by weight, or in an amount of about 85% to about 95% by weight. As used herein, the term "% by weight" is meant to indicate a percentage based on 100% total weight of the composition. In exemplary embodiments, the polymer material may be a low viscosity resin having a molecular weight from about 50,000 daltons to about 1,000,000 daltons or from about 120,000 daltons to about 150,000 daltons. As used herein, the term "molecular weight" is meant to denote a weight average molecular weight.

It is to be appreciated that the properties of the extruded foam or foam product may be modified by the selection of the molecular weight of the polymer. For example, the preparation of lower density extruded foam products is facilitated by using lower molecular weight polymers. On the other hand, the preparation of higher density extruded foam products is facilitated by the use of higher molecular weight polymers or higher viscosity resins.

The foamable composition also includes at least one blowing agent. The blowing agent may be selected from carbon dioxide, 1,1,1,2-tetrafluoroethane (HFC-134a), and aliphatic alcohols, such as, but not limited to $C_1$ to $C_3$ aliphatic alcohols (e.g., methanol, ethanol, n-propanol, and isopropanol), carbon dioxide, supercritical carbon dioxide, and mixtures thereof. In at least one exemplary embodiment, the blowing agent is supercritical carbon dioxide. The supercritical carbon dioxide may be present in the polymer melt in a concentration up to about 6.0 parts per hundred (pph) based on the total polymer resin weight, and in exemplary embodiments, from about 2.5 to about 2.5 pph.

Additional (e.g., secondary blowing agents) or alternative blowing agents to those described above that may be included in the foamable composition include physical and chemical blowing agents. A non-exhaustive list of suitable physical blowing agents include any hydrocarbon (HC) blowing agent (e.g., propane, butane, iso-butane, pentane, isopentane, hexane, cyclopentane, and other homolog series thereof; acetone; and dimethyl ether); HCFC blowing agents (e.g., 1,1-dichloro-1-fluoroethane (HCFC-141b), choloro-difluoromethane (HCFC-22), 1,1-dicholoro-2,2,2-trifluoroethane (HCFC-123), 1-choloro-1,2,2,2-tetrafluoroethane (HCFC-124), HCFC-225ca and HCFC-225cb and thereof; an HFC blowing agent (e.g., 1,1,1,2-tetrafluoroethane (HFC-134a), 1,1-difluoroethane (HFC-152a), 1,1,1,3,3,3-hexafluoropropane (HFC-236fa), 1,1,1,3,3-pentafluorobutane (HFC-365mfc)); and nitrogen. Examples of suitable chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, and N,N'-dimethyl-N,N'-dinitrosoterephthalamide, and trihydrazino triazine. It is to be appreciated that any of the blowing agents for use in the foamable composition can be used singly or in any combination thereof.

The blowing agent(s) may be present in the composition in an amount from about 0% to about 15% by weight. In exemplary embodiments, the blowing agent is present in an amount from about 0% to about 12% by weight, or from about 2.5% to about 10% by weight. In exemplary embodiments, the blowing agent utilized in the inventive composition is selected such that the composition has zero ozone depletion and low to no global warming potential.

Additionally, the composition contains at least one porous carbon-containing compound that is stable at foaming temperature (i.e., at least at about 220° C.), possesses a high water absorbing capability (i.e., up to 100% of its own weight), and is able to selectively absorb low molecular weight solvents such as, but not limited to, water, carbon dioxide nitrogen, alcohols (e.g., ethanol and methanol), acetone, dimethyl ether (DME), HFCs and HCFCs (e.g., HFC-134a, HFC-152a, and HCFC-142b), propylene carbonate, ethylene carbonate, and adipate diesters, but not higher molecular weight molecules, such as polystyrene. In exemplary embodiments, the porous carbon containing compounds can selectively absorb solvents having molecular weights up to approximately 500 daltons, and in some embodiments, up to approximately 250 daltons.

As discussed below, the porous carbon-containing compound can have a pore size that falls into a micro, mesa, or macro size range. In exemplary embodiments, the porous carbon-containing compound serves as a water carrier. Polystyrene, and most other thermoplastic polymers, are hydrophobic and do not readily absorb significant amounts of water. As a result, a carrier may be used to carry water into the polymer melt within the extruder. One particular porous carbon-containing compound, activated carbon, is highly porous and has very high water absorption characteristics. The physical properties of powdered activated carbon differ markedly, as illustrated by the varying particle size distribution, absorption, surface chemistry, diffusion effect, and purity. Powdered activated carbon, due to its ability to absorb small molecules such as water, was chosen for use in exemplary embodiments of the instant invention.

Activated carbon can come in a variety of forms, such as activated charcoal, coconut shell, wood, or husk (e.g., husk powder or psyllium husk powder). In addition, the activated carbon can come in a variety of sizes, including micro-porous activated carbon having pore diameters less than 2 nm, meso-porous activated carbon having pore diameters from 2 nm to 50 nm, and macro-porous activated carbon having pore diameters greater than 50 nm. In at least one exemplary embodiment, powdered activated carbon, particularly powdered activated carbon having an average particle size from about 1 to about 100 microns, or from about 10 to about 30 microns, is utilized. In addition, the activated carbon may have an absorption index (methylene blue) greater than 10 g/100 g, or greater than 20 g/100 g.

For ease of discussion, reference will be made hereafter with respect to the use of activated carbon, though any porous carbon-containing compound having the heat stability, high water absorption, and selective absorption characteristics as set forth above may be utilized. Activated carbon permits a desired amount of water to be introduced into the polymer melt. By controlling the amount of activated carbon and its water content during the extrusion process, a broad range of cell sizes can be obtained in the extruded product. As discussed in detail below, water can be impregnated (absorbed) into the powdered activated carbon or its compounded form in a polymer carrier, such as polystyrene, from water e.g., (humidity controlled chamber) or steam (e.g., steam impregnation) before the extruding process. Alternatively, water can be absorbed into the activated carbon during the extruding process under high pressure. In either situation, the water may be treated with a surfactant, emulsifier, or wetting and penetrating agent such as, but not limited to, sodium bis(2-ethylhexyl) sulfosuccinate (commercially available from AOT), and Lutensit® A-BO, a sodium dioctylsuiphosuccinate (commercially available from BASF); a neutralizer such as sodium bicarbonate; a corrosion inhibitor such as Accepta 2018, a cyclohexylamine-based neutralizing amine and Accepta 2013, a sodium hydroxide-based pH adjuster with sodium bicarbonate as neutralizer (both commercially available from Accepta); and chemical blowing agents such as axodicarbonamide, azodiisobutyro-nitrile, or benzenesulfonhydrazide.

The polymeric foam composition includes at least one porous carbon-containing compound (e.g., activated carbon) in an amount from about 0.1% to about 10% by weight of the total composition, and from about 1.0% to about 5.0% by weight. In at least one exemplary embodiment, the activated carbon may have an impregnated water content from about 0.2% to about 2.0% based on the total resin weight, or from about 0.2% to about 0.8%. The activated carbon has the ability to control the cell size in the foam while blowing agents such as carbon dioxide or HFCs and infrared attenuating agents are used in the polymeric foam composition. In particular, the use of activated carbon permits foams to have desired cell sizes ranging from about 100 microns to about 400 microns or from about 250 microns to about 300 microns. Accordingly, the water impregnated activated carbon acts as a cell size enlarging agent. In embodiments according to the present invention, the activated carbon is non-encapsulated.

The foamable composition may also contain at least one infrared attenuating agent (IAA) to increase or maintain the R-value of the foam product. Examples of such infrared attenuating agents that may be utilized include, but are not limited to carbon black, granulated asphalt, milled glass, fiber glass strands, mica, black iron oxide, titanium dioxide, metal flakes such as aluminum flakes, and combinations thereof. In exemplary embodiments, the infrared attenuating agent is present in the foam composition in an amount from about 0% to about 10% by weight of the total composition. In other embodiments, the infrared attenuating agent may be present in an amount from about 0.1 to about 5.0% by weight of the total composition, or from about 0.2 to about 2.0% by weight.

Further, the inventive composition may contain a fire retarding agent in an amount up to about 1.0% by weight. For example, fire retardant chemicals may be added in the extruded foam manufacturing process to impart fire retardant characteristics to the extruded foam products. Preferably, the fire retarding agent is added to the foamable gel, which is described below with respect to the formation of the inventive foam. Non-limiting examples of suitable fire retardant chemicals for use in the inventive composition include brominated aliphatic compounds such as hexabromocyclododecane (HBCD) and pentabromocyclohexane, brominated phenyl ethers, esters of tetrabromophthalic acid, and combinations thereof. In at least one exemplary embodiment, a micro-encapsulated HBCD may be utilized to eliminate the reaction of water and the brominated flame retardant during processing at an elevated temperature.

Optional additives such as nucleating agents, plasticizing agents, pigments, elastomers, extrusion aids, antioxidants, fillers, antistatic agents, biocides, and/or UV absorbers may be incorporated into the inventive composition. These optional additives may be included in amounts necessary to obtain desired characteristics of the foamable gel or resultant extruded foam products. The additives may be added to the polymer mixture or they may be incorporated in the polymer mixture before, during, or after the polymerization process used to make the polymer.

To form an alkenyl aromatic polymer foam according to the principles of the instant invention, the foamable polymer material (e.g., polystyrene) may be heated to a temperature at or above the polymer's glass transition temperature to form a plasticized or a melt polymer material in a primary extruder. Activated carbon may be blended in the polymer melt or dry blended with the polymer material prior to plasticizing or melting the foamable polymer material. It is to be appreciated that activated carbon may also be added directly to the primary extruder as a powder, in a compact form, or in a slurry separate from the polymer material. In one or more exemplary embodiments, as described in detail below, the activated carbon is compounded with a polymer resin and hydrated prior to its addition to the secondary extruder. It is to be appreciated that the addition of the activated carbon to the primary extruder and the addition of the "pre-hydrated" activated carbon to the secondary (or primary) extruder are mutually exclusive of each other. As indicated above, it is also to be appreciated that, as used herein, "hydrated" may be used interchangeably with "impregnated" and "pre-hydrated" may be interchangeably used with "pre-impregnated".

One or more blowing agents may be incorporated or mixed into the melt polymer material by any conventional method known to those of skill in the art such as, for example, with an extruder, a mixer, or a blender. As the blowing agent is added to the polymer melt, the blowing agent becomes soluble, i.e. dissolves, in the polymer melt and forms a foamable gel. Additionally, the blowing agent may be mixed with the melt polymer material at an elevated pressure sufficient to prevent substantial expansion of the melt polymer material and to generally disperse the activated carbon and blowing agent(s) homogeneously or substantially homogeneously in the melt polymer material.

The foamable gel may then be passed to a secondary extruder and cooled to a die melt temperature. The die melt temperature is typically cooler than the melt mix temperature to optimize the physical characteristics of the foamed product. In addition, the die pressure may be sufficient to prevent, or at least minimize, pre-foaming of the foamable gel. Pre-foaming is the undesirable premature foaming of the foamable gel before extrusion of the gel into a region of reduced pressure. It is to be appreciated that the die pressure varies depending upon the identity and amount of blowing agent(s) present in the foamable gel.

If the activated carbon is not "pre-hydrated" ("pre-impregnated"), water may be directly injected into the secondary extruder where it is absorbed by the pores of the activated carbon under high pressure. In exemplary embodiments, all or nearly all of the water is absorbed by the activated carbon. It is to be appreciated that other liquids that evaporate, decompose, or react under the influence of heat to form a gas, such as, but not limited to, hydrocarbons, halogenated hydrocarbons, alcohols, dihydric alcohols, polyhydric alcohols, ketones, esters, ethers, amides, acids, and/or aldehydes may be also, or alternatively, utilized. Water will be described herein as an exemplary liquid absorbed by the activated carbon. The location of the injection of water into the secondary extruder is not particularly limited, so long as the water is injected prior to the extrusion die. Because the activated carbon has been at least substantially homogeneously distributed within the foamable gel by the primacy extruder, the water is also at least substantially distributed within the foamable gel. The water in the foamable gel may act as a liquid blowing agent. Thus, the activated carbon acts as a carrier to bring the liquid blowing agent into the foamable gel. It is to be noted that it is within the purview of the invention to inject the water into the primary extruder instead of, or in addition to, the secondary extruder. However, in exemplary embodiments, the water is injected into the secondary extruder at least in part due of the decreased chemical reactivity as a result of the much lower temperature of the secondary extruder.

Alternatively, if the activated carbon is "pre-hydrated", as discussed in detail below, the hydrated activated carbon/polymer resin compounded is added to the secondary extruder, where it is substantially homogenously distributed within the foamable gel.

The foamable gel may then be extruded through a die having a desired shape to a zone of lower or reduced pressure to form the desired foamed structure or foamed product. The zone of lower pressure is at a pressure lower than that in which the foamable gel is maintained prior to extrusion through the die. The lower pressure may be superatmospheric or subatmospheric (i.e., a vacuum), but in most embodiments, it is at atmospheric level. The foam this produced is a rigid, closed cell, polymer foam.

The amount of activated carbon and water present in the polymer melt can be independently controlled so that a desired amount of water is added to the polymer in the foamable gel. In addition, the water is added at the die melt temperature, a temperature that is lower than the temperature within the primary extruder. Thus, the temperature of the foamable gel in the secondary extruder is much lower than the temperature of the foamable gel in the primary extruder. This lower temperature minimizes the formation of hydrobromic acid (HBr) in the secondary extruder. As a result, the potential for corrosive behavior from the HBr will be significantly reduced. In addition, there is less corrosion to the elements of the primary extruder because the water is added after the primary extruder.

Extruded foams have properties required for different applications, and all depend on the foam cell morphology, namely, the cell size, cell strut effective diameter, cell wall thickness, call anisotropic ratio, and closed/open cell ratio. Among these characteristics of cell structure, the cell size is one of the most important parameters in process control. Controlling the amount of activated carbon and water in the polymer melt provides an effective means to control the cell size of the foams and achieve a broad range of desired cell sizes for the polymeric foams. Additionally, both process and physical properties of the foam products can be improved.

Turning to FIG. 1, a primary and secondary extruder in flow communication for use in conjunction with the embodiments described herein are illustrated. As discussed above, in one exemplary embodiment, the activated carbon and water are added separately to a primary and secondary extruder, respectively. A primary screw extruder for use in the present invention is generally indicated at reference numeral 10. The screw extruders for use in the instant invention may equally be a single screw or twin screw extruders. For ease of discussion, reference is made herein with respect to a single screw extruder. The extruder 10 is formed of a barrel 12 and at least one screw 14 that extends substantially along the length of the barrel 12. A motor may be used to power the screw 14. The screw 14 contains helical flights 16 rotating in the direction of arrow 18. The flights 16 of the screw 14 cooperate with the cylindrical inner surface of the barrel 12 to define a passage for the advancement of the resin and activated carbon through the barrel 12. The foamable polymer material (polymeric resin) may be fed into the screw extruder 10 as flowable solid, such as beads, granules, or pellets from one or more feed hoppers 20.

As shown in FIG. 1, hoppers and ports are provided at designated positions on the extruder for the addition of the polymeric resin and the activated carbon and the injection of the blowing agent(s) to the barrel 12. For instance, a port 23 is provided downstream of a feed hopper 20 to inject the blowing agent(s) into the barrel 12. It is to be noted, however, that other ports and/or hoppers may be present on the barrel 12 for the inclusion of other materials or additives, such as, but not limited to, flame retardants, nucleating agents (e.g., talc), biocides, plasticizing agents, pigments, elastomers, extrusion aids, antioxidants, fillers, and/or antistatic agents. Color pellets may be fed into the extruder 10 from a color pellet hopper (not shown) to give the final product a desired color or appearance. In addition, there may be a separate port or hopper for the addition of the activated carbon to the barrel 12 independently of the polymeric resin. The resin and the activated carbon may be added to the barrel 12 through hopper 20 simultaneously or nearly simultaneously. For example, the activated carbon can be compounded with the polymeric resin and added to the feed hopper 20 as a compounded material. As used herein, the term "substantially simultaneously" is meant to indicate that the polymer resin and activated carbon are fed into the barrel 12 at the same time or at nearly the same time.

As the foamable polymer material flows through the extruder 10 downstream in the direction of arrow 18, the spacing between the flights 16 of the screw 14 decreases. The term "downstream" as used herein refers to the direction of resin and activated carbon (and other compounds, blowing agents, or additives) through the barrels of the primary and secondary extruder 12, 32. This decreasing volume, together with the mechanical action and friction generated from the barrel 12 and the screw 14, causes the foamable polymer material to melt and form the melt polymer material.

As the blowing agent(s) is added to the polymer melt the blowing agent becomes soluble, i.e. dissolves, in the polymer melt. In one exemplary embodiment of the invention, all of the blowing agent is added to the polymer melt through injection port 23 and is not pre-blended with the polymeric resin. In an alternate embodiment, a portion of the blowing agent is pre-blended with the polymeric resin. The remaining portion of the blowing agent may then be added via injection port 23 in direct communication with the barrel 12. By adding a portion of the blowing agent via injection port 23, the amount of blowing agent added to the polymeric resin, and ultimately into the final product, can be accurately monitored and adjusted as necessary throughout the extrusion process.

Once the polymeric resin, activated carbon, and blowing agent(s) have been introduced into the barrel 12, the resulting foamable gel is subjected to additional blending to substantially uniformly distribute the activated carbon and blowing agent throughout the foamable gel. The foamable gel then flows through the primary extruder 10 in the direction of arrow 18 until it reaches conduit 22.

The foamable gel is passed through conduit 22 and into the secondary screw extruder 30 where the foamable gel is cooled to the die melt temperature. The water may be added at any location along the barrel 32 of the secondary extruder 30 so long as the water is injected prior to the extrusion die 34 (and after the primary extruder 10). In one exemplary embodiment, the water is injected at injection port 33. A seal assembly 36 prevents the backflow of the foamable gel. The activated carbon quickly and efficiently absorbs the water due to its high affinity for water and high pressure within the extruder. In addition, the fine pore size of the activated carbon enables the prediction of the effectiveness of small molecules (e.g., water) to be absorbed but not large molecules (e.g., polystyrene).

The foamable gel is then conveyed through the extruder 30 by the action of the screw(s) and through an extrusion die 34 which is designed to contour the foam into a desired shape and to create a pressure drop which permits the blowing agent to expand and develop a foamed cell structure in the form of a foam layer or slab. This area of reduced pressure within the extrusion die may be at or below atmospheric pressure (i.e., a vacuum). The polymeric foam may be subjected to additional processing such as calendaring, water immersion, cooling sprays, or other operations to control the thickness and other properties of the resulting foam product.

In an alternate embodiment, the water is added to the polymer melt in the primary extruder 10, such as through injection port 23, after the addition of the activated carbon. The water is quickly absorbed by the pores of the activated carbon due to activated carbon's high affinity for water and the high pressure within the barrel 12. The resulting foamable gel is subjected to additional blending to substantially uniformly distribute the hydrated activated carbon and blowing agent throughout the polymer gel as it is conveyed downstream in the barrel 12. The foamable gel is then passed through conduit 22 and into the secondary extruder 30, where the foamable gel is further processed at the die melt temperature. If desired, additional water may be injected into the secondary extruder at any location on the barrel 32, so long as it is added prior to the foamable gel reaching the extrusion die 34. As with the embodiment discussed above, the foamable gel is then conveyed through the extrusion die 34 to produce the polymer foam.

In a separate embodiment, the activated carbon is "pre-hydrated" prior to its addition to the extruder. For instance, the activated carbon may be placed in a conditioning room or other enclosure or chamber where the temperature and humidity within the room or enclosure can be accurately controlled. To "pre-hydrate" the activated carbon, the activated carbon may be compounded with the polymeric resin to form a porous activated carbon/polymer resin compound. The porous compound may then be placed in the conditioning room (humidity chamber) where the activated carbon absorbs water from the air over a time period from about 1 to about 3 days. By placing the activated carbon into a controlled humidity environment, the amount of water absorbed into the activated carbon can be controlled and the activated carbon can be hydrated, or "pre-hydrated", to a specific, desired amount. The phrase "pre-hydrated activated carbon", as used herein, is meant to include activated carbon that has been impregnated with water (or other liquid that evaporates, decomposes, or reacts under the influence of heat to form a gas) prior to addition to an extruder. In exemplary embodiments, the activated carbon contains from about 0.5 to about 10% by weight water, or from about 1.0 to about 3.0% by weight water.

Alternatively, the activated carbon can be "pre-hydrated" by steam impregnation. In this exemplary embodiment, the activated carbon may first be compounded with the polymeric resin to form a porous activated carbon/polymer resin compound. The porous compound may then be placed into a pressurized container and treated with steam for several minutes. The time period for the steam impregnation is dependent upon the pressure of the container, but is generally less than 10 minutes. In at least one exemplary embodiment, the time period is from about 1 to about 3 minutes. At an elevated pressure, less time is needed to hydrate the activated carbon within the porous compound. The pressure of the container may range from 0 to about 200 psi, and in some exemplary embodiments, from about 2.0 to about 10 psi. With steam impregnation, the activated carbon quickly absorbs the water to achieve the desired hydration, particularly when compared to hydrating the activated carbon in a humidity controlled environment.

Once the pre-hydration of the activated carbon is complete, the hydrated porous compound may be added to the secondary extruder 30. In such an exemplary embodiment, a portion of the polymeric resin may be utilized to form the activated carbon/polymer resin porous compound and a second portion of the polymeric resin may be added to the primary extruder 10 (without compounding) as discussed in detail above. For instance, the "second" portion of the polymeric resin may be added to the primary extruder 10 through the feed hopper 20. The polymeric resin flows downstream through the barrel 12 while mechanical action and friction generated from the barrel 12 and the screw 14 causes the foamable polymer material to melt and form the melt polymer material.

At least one blowing agent may be added to the melt polymer material, such as by injection port 23, to form a foamable gel. The foamable gel flows through the remainder of the barrel 12 of the primary extruder 10 to the conduit 22. By the time the foamable gel reaches the conduit 22, the blowing agent is substantially evenly distributed within the polymer melt. The foamable gel may then be passed through conduit 22 and into the secondary extruder 30 where the foamable gel is cooled from the melt mix temperature in the primary extruder to the die melt temperature in the secondary extruder. In exemplary embodiments, the hydrated porous compound is added at the melt sealing feeder 36. Alternatively, the hydrated porous compound may be added at a feed hopper positioned on the secondary extruder 30, such as feed hopper 38 illustrated in FIG. 1. The foamable gel containing the hydrated porous compound may then be conveyed through the barrel 32 of the extruder 30. The foamable gel exits the barrel 32 through the extrusion die 34 to form a polymer foam as discussed above.

In an alternate exemplary embodiment, the hydrated porous compound may be fed into the primary extruder 10 through the feed hopper 20. In this exemplary embodiment, the hydrated porous compound may be added to the primary extruder 10 through the feed hopper 20 with or without additional polymeric resin. Similar to the other exemplary embodiments described herein, the hydrated porous compound (containing the additional polymeric resin) flows through the barrel 12 of the primary extruder 10 at a melt mix temperature to form the melt polymer material.

A blowing agent or agents may be injected into the polymer melt at injection port 23 to form a foamable gel. The foamable gel may be blended within the barrel 12 of the extruder 10 to substantially uniformly distribute the water-impregnated activated carbon and blowing agent throughout the polymer gel. The foamable gel may be fed through conduit 22 and into the secondary extruder 30, where the foamable gel is further processed at the die melt temperature. It is to be appreciated that if the activated carbon is pre-hydrated, either by a controlled humidity environment or steam impregnation, there is no need to directly inject water into either the primary or secondary extruder. However, if desired, water may be injected into the secondary extruder 30 at any location on the barrel 32 prior to the extrusion die 34, or at any point in the primary extruder 10. As with the embodiments discussed above, the foamable gel is then conveyed through the extrusion die 34 to produce the polymer foam.

In an alternate embodiment, the activated carbon may be placed into a humidity chamber or be steam impregnated to pre-hydrate the activated carbon, such as described in detail above, but without any compounding with a polymeric resin. This pre-hydrated activated carbon may be added to either the primary extruder or the secondary extruder. For instance, the pre-hydrated activated carbon may be fed into the primary extruder 10 through the feed hopper 20 with the polymeric resin. The pre-hydrated activated carbon flows through the barrel 12 of the primary extruder 10 and mixes with the polymeric resin to form a melt polymer material. One or more blowing agents may be injected into the polymer melt at injection port 23 to form a foamable gel. The foamable gel is further blended within the barrel 12 of the extruder 10 to substantially uniformly distribute the pre-hydrated activated carbon and blowing agent throughout the polymer gel. The foamable gel may be fed through conduit 22 and into the secondary extruder 30, where the foamable gel is further processed at the die melt temperature. There is no need to add additional water to either the primary or secondary extruder because the activated carbon is pre-hydrated. It is, however, within the purview of the invention to directly inject water into the secondary extruder 30 at any location on the barrel 32 prior to the extrusion die 34, or at any point in the primary extruder 10. As with the embodiments discussed above, the foamable gel is then conveyed through the extrusion die 34 to produce the polymer foam.

If the pre-hydrated activated carbon is added to the secondary extruder 30, it may be added through the melt seal feeder 36 or though feed hopper 38. In particular, the polymeric resin may be added to the primary extruder 10 and the blowing agent(s) may be injected into the primary extruder 10 at injection port 23. Once the polymeric resin and blowing agent(s) are introduced into the primary extruder 10 and are blended to form a foamable gel in which the blowing agent is substantially evenly distributed throughout the foamable gel, the foamable gel exits the primary extruder 10 and flows through conduit 22 and into the secondary extruder. The pre-hydrated activated carbon may be added to the secondary extruder at the melt seal feeder 36. The pre-hydrated activated carbon is thoroughly mixed within the foamable gel at the die melt temperature. The foamable gel is conveyed through the second extruder 30 and is passed through the extrusion die as described previously to form a foam.

The foam composition according to one aspect of the present invention produces rigid, closed cell, polymer foam boards prepared by an extruding process. Extruded foams have a cellular structure with cells defined by cell membranes and struts. Struts are formed at the intersection of the cell membranes, with the cell membranes covering interconnecting cellular windows between the struts. In the present invention, the inventive composition produces substantially closed cellular foams with an average density of about 1.5 lbs/ft$^3$ to about 5.0 lbs/ft$^3$, or from about 1.8 lbs/ft$^3$ to about 3.0 ls/ft$^3$. It is to be appreciated that the phrase "substantially closed cell" is meant to indicate that the foam contains all closed cells or nearly all of the cells in the cellular structure are closed. In most exemplary embodiments, not more than about 5.0% of the cells are open cells or otherwise "non-closed" cells. The closed cell structure helps to increase the R-value of a formed, foamed insulation product. It is to be appreciated, however, that it is within the purview of the present invention to produce an open cell structure, although such an open cell structure is not an exemplary embodiment.

Additionally, the inventive foam composition produces extruded foams that have a desired cell size. In at least one embodiment, the average cell size of the inventive foam and foamed products is about 0.100 mm (100 microns) to about 0.400 mm (400 microns) and, in some embodiments, from about 0.250 mm (2500 microns) to about 0.300 mm (300 microns). The extruded inventive foam may be formed into an insulation product such as rigid insulation boards, insulation foam, packaging products, as building insulation or underground insulation (e.g., highway, airport runway, railway, and underground utility insulation), and in commercial application such as industrial walk-in refrigerators and freezers.

Another aspect of the extruded inventive foams is that they possess a high level of dimensional stability. For example, the change in dimension in any direction is about 5% or less. In addition, the foam formed by the inventive composition is desirably monomodal and the cells have a relatively uniform average cell size. As used herein, the average cell size is an average of the cell sizes as determined in the X, Y and Z directions. In particular, the "X" direction is the direction of extrusion, the "Y" direction is the cross machine direction, and the "Z" direction is the thickness. In the present invention, the highest impact in cell enlargement is in the X and Y directions, which is desirable from an orientation and R-value perspective. In addition, further process modifications would permit increasing the Z-orientation to improve mechanical properties while still achieving an acceptable thermal property. The extruded inventive foam can be used to make insulation products such as rigid insulation boards, insulation foam, and packaging products.

There are numerous advantages of utilizing the composition of the present invention to form foam products. For example, the blowing agent utilized in the inventive formulation does not have a high global warming potential and has a low or zero ozone depleting potential. In addition, the activated carbon and water may be added to the melt polymer in a conventional fashion. Therefore, there is no need to modify existing equipment or change the manufacturing lines to accommodate either the activated carbon or the water. In addition, activated carbon is environmentally friendly and does not create any negative environmental concerns. Further, the activated carbon increases the average cell size of the foamed product without detrimentally affecting the physical or thermal properties of the product. The activated carbon functions as a cell size controlling agent, a cell size enlarging agent, a process aid, and an infrared attenuating agent.

Having generally described this invention, a further understanding can be obtained by reference to certain specific examples illustrated below which are provided for purposes of illustration only and are not intended to be all inclusive or limiting unless otherwise specified.

EXAMPLES

Example 1

A micro-porous compound (PS/PAC25) which consisted of 75 wt % polystyrene (NOVA 1600 from NOVA Chemical, PA) and 25 wt % powdered activated carbon (DARCO KB-G from Norit Americas Inc., Texas) was prepared by an extrusion process using an LMP twin extruder from Leistitz.

The formed micro-porous compound, PS/PAC25 was measured for porosity, pore size, and density by a mercury intrusion analysis. The results are set forth in Table 1.

TABLE 1

Porosity Analysis of Micro-Porous PS/PAC25 Compound

| Item | Intrusion Data Summary |
|---|---|
| Porosity | 18.61% |
| Median Pore Diameter (Volume) | 0.396 micron |
| Median Pore Diameter (Area) | 0.005 micron |
| Average Pore Diameter (4V/A) | 0.02 micron |
| Total Pore Area | 0.194 mL/g |
| Bulk Density at 0.55 psia | 0.957 g/mL |
| Apparent Density | 1.176 g/mL |

The micro-porous compound was further treated by (1) temperature and humidity conditioning and (2) steam impregnation. In the temperature and humidity conditioning test, the micro-porous compound was placed in a conditioning room where the temperature was controlled between 20° C. and 30° C. and the relative humidity was maintained between 50 and 98% for 24 to 72 hours. The granule of the PS/PAC25 compound had a size from about 2-3 mm. Table 2 summarizes the water content of the micro-porous compounds under various temperature and humid conditions.

TABLE 2

| Compound Loading (%) | Conditioning Control Temperature/Relative Humidity | $H_2O$ Absorbed wt % by Duration Days | | |
|---|---|---|---|---|
| | | 1 day | 2 day | 3 day |
| 40 (NG679[a]) | 70° F./50% RH | 0.06 | 0.06 | 0.06 |
| | 98° F./80-85% RH | 0.34 | 0.43 | 0.44 |
| 25 (CA3[b]) | 70° F./50% RH | 0.59 | 0.63 | 0.65 |
| | 98° F./80-85% RH | 1.56 | 1.79 | 1.80 |
| 25 (KB-G[b]) | 70° F./50% RH | 0.37 | 0.38 | 0.40 |
| | 98° F./80-85% RH | 0.99 | 1.05 | 1.05 |

[a]Control sample, expanded graphite NG679 40% compound.
[b]Polystyrene with 25% of powered activated carbon (CA3 or KB-G, both of which are produced by chemical activation of wood using a phosphoric acid process from Norit Americas Inc, Texas).

In the steam impregnation test, micro-porous compounds were treated with steam in an unpressurized container for about 10 minutes and in a pressurized container for about 5 minutes. Table 3 shows that after pressure steaming a powdered activated carbon-polystyrene compound for 5 minutes in a pressurized container, there was marked increased in the water content of the compounded material. These experiments demonstrated that powdered activated carbon, after compounding with a polymer, remained an effective water absorbent.

TABLE 3

| PAC* | PS/PAC2S-SI $H_2O$ Wt % After Steam Impregnation |
|---|---|
| KB-G | 22.7 |
| CA3 | 20.8 |

*Darco activated carbon produced by chemical activation of wood using a phosphoric acid process from Norit Americas Inc, Texas.

Example 2

In the following samples and control samples, rigid polystyrene foam boards are prepared by a twin screw LMP extruder. Table 4 shows the process conditions for samples in a twin screw extruder for making foam boards having a width of 16 inches and a thickness of one inch.

TABLE 4

Process Conditions of Samples

| Wt % of HFC-134a | 4 |
|---|---|
| Wt. % of $CO_2$ | 2 |
| Inject Pressure, Kpa (psi) | 13000-17000 (1950-2400) |
| Die Melt Temperature, (° C.) | 110-130 |
| Die Pressure, Kpa (psi) | 6900-8280 (1000-1200) |
| Line Speed, m/min (ft/min) | 5-10 (16-35) |
| Throughput, kg/hr | 150-200 |
| Die Gap, mm | 0.8-1.5 |
| Vacuum KPa (inch Hg) | 0-3.4 (0 to 16) |

The results of Example 2 are summarized in Tables 5 and 6. The cell size was determined by Nikon Optiphot-2 optical microscope and Clemex Vision image analysis software. The density of foam was measured according to ASTM C-303.

TABLE 5

| Sample ID | PAC Wt % | Nano-graphite Wt % | Average Cell Size mm |
|---|---|---|---|
| P-G1 | 0 | 0 | 0.16 |
| P-G2 | 0 | 1.12 | 0.14 |
| P-G3 | 0 | 1.25 | 0.13 |
| P-G4 | 0 | 1.68 | 0.11 |
| P-G5 | 0 | 2.24 | 0.09 |
| P-A1 | 0 | 0 | 0.16 |
| P-A2 | 0.5 | 0 | 0.20 |
| P-A3 | 1 | 0 | 0.21 |
| P-A4 | 1.5 | 0 | 0.27 |
| P-A5 | 2 | 0 | 0.27 |

TABLE 6

| Sample ID | Injected Water Wt % | Average Cell Size mm | Density Kg/m3 (pcf) |
|---|---|---|---|
| P-H1 | 0 | 0.312 | 31.2 (1.95) |
| P-H2 | 0.2 | 0.302 | 28.2 (1.76) |
| P-H3 | 0.4 | 0.326 | 26.9 (1.68) |

The data set forth in Table 6 illustrated by adding 0.2 wt % of actual PAC (or 0.8 wt % of PS/PAC25 compound), plus injecting water up to 0.4 wt % during the process, the width of the board expanded from approximately 20 inches to approximately 23 inches and the density of the extruded polystyrene foam was also reduced from approximately 31 $Kg/m^3$ to approximately 27 $Kg/m^3$.

Figure 2:
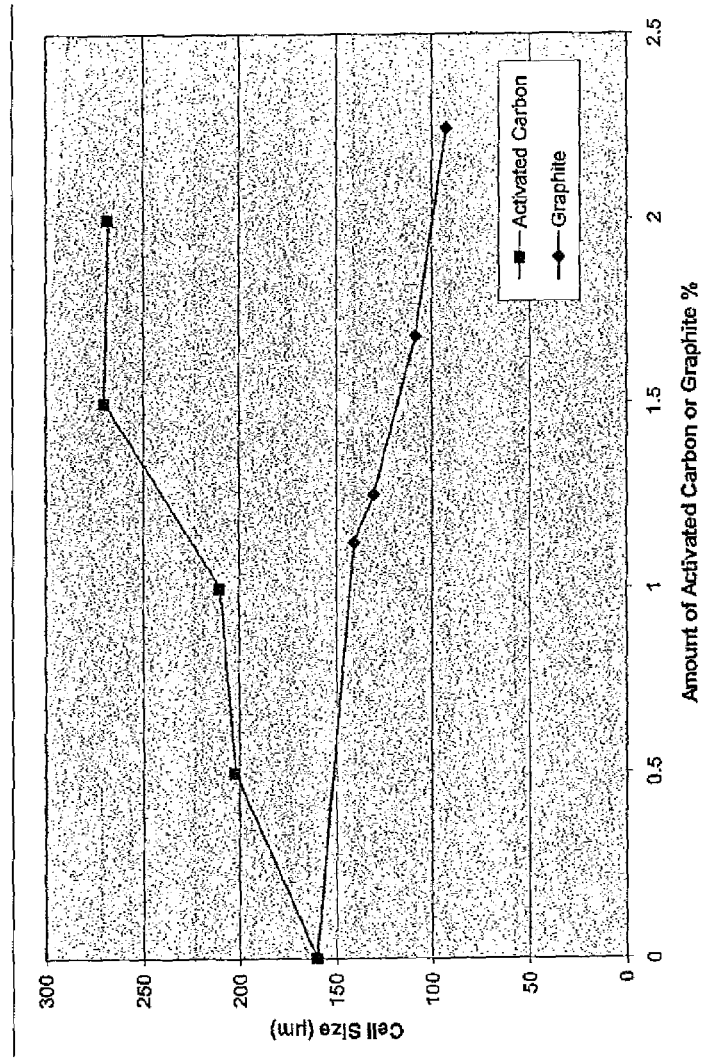
FIG. 2 is a graphical illustration depicting the cell sizes of a polystyrene foam containing varying amounts of activated carbon versus a polystyrene foam containing varying amounts of a nucleating agent (i.e., nanographite)

As shown in FIG. 2, the addition of nano-graphite in a foaming process has a profound effect on the cell size nucleation. On the other hand, the addition of the micro-porous activated/polystyrene compound with around a 2.2 to 2.3 wt % of water content worked as an effective cell-size enlarging agent.

Example 3

The polystyrene resin utilized in this example was a polystyrene having a melt index around 5.2 and a molecular weight of 250,000 (NOVA 1600 from NOVA Chemical, Inc., PA). The micro-porous compound from Example 1, PS/PAC25, was mixed with the polystyrene before feeding the micro-porous compound/polystyrene mixture into a co-rotation twin extruder (Leistritz ZSE-27 with D 27 mm and L/D 40).

The blowing agent, carbon dioxide (from Praxair), was injected into the extruder at the L/D 16 position (the melting and mixing zone) by a type ISCO 1000 D syringe pump. During entire extrusion process, the temperature and pressure were maintained above the super-critical points, i.e., the carbon dioxide kept at the super critical phase before the foaming at die end.

Water was injected by a separated ISCO 1000D syringe pump at the 26 position (the conveying zone) close to the die. During the extrusion process before foaming, the water was kept in a liquid phase according to the water P-T phase diagram.

The formulations and corresponding cell sizes are set forth in Table 7. The test parameters were kept in same in order to compare the effect of the powdered activated carbon and water: i.e., screw speed at 50 rpm, die temperature 115 to 120° C., die pressure 1,200 to 1,400 psi, melt temperature 130 to 135° C.

TABLE 7

| | Formula | | | | |
|---|---|---|---|---|---|
| Sample ID | PS wt % | Compound(PAC) wt % | $H_2O$ wt % | $scCO_2$ phh | Cell Size microns |
| Control | 88 | 12(3) | 0 | 4 | <100 (not able to process) |
| 1 | 88 | 12(3) | 0.4 | 4 | 272 |
| 2 | 88 | 12(3) | 0.6 | 4 | 263 |
| 3 | 80 | 20(5) | 0.6 | 4 | 243 |

It was concluded from the data set forth in Table 7 that powdered activated carbon as a water carrier (with a 3 to 5 wt % activated carbon and 0.4 to 0.6 wt % water) was an effective cell size enlarging agent. Additionally, it was determined that the activated carbon also contributed to increasing the cell size of the produced foam. In particular, the cell size was increased by more than 100%. Additionally, a desired average cell size from about 240 to about 280 microns was achieved in the foam board utilizing $scCO_2$ as the blowing agent.

Example 4

Foam samples were prepared according to the procedure set forth above with respect to Example 3 except that two additives were used. Namely, the water was pre-treated with a mix of 10% of sodium bicarbonate based on 100% of the water weight and a micro-encapsulated hexabromocyclododecane (ME-HBCD) was used as a fire retardant. The test data is summarized in Table 8,

TABLE 8

| | Formula | | | | | |
|---|---|---|---|---|---|---|
| Sample ID | PS wt % | PS/PAC25 Compound wt % | $H_2O$ ($NaHCO_3$) wt % | ME-HBCD | $scCO_2$ phh | Cell Size microns |
| A | 88 | 12(3) | 0.4 | 0 | 4 | 267 |
| B | 87 | 12(3) | 0.4 | 1 | 4 | 267 |
| C | 78 | 20(5) | 0.6 | 2 | 4 | 290 |

The data set forth in Table 8 demonstrated that during an extrusion process using powdered activated carbon, there was no observable reaction between the micro-encapsulated brominated flame retardant and water.

In addition, the cell morphology of the samples from Examples 3 and 4 were observed with the use of a scanning electron microscope (SEM). The average cell wall thickness between two cells, the effective diameter of the cell strut where three or more cells meet, and the cell sizes were measured. The results are summarized in Table 9. In Table 9, x is the extruding direction, y is the board width direction, and z is the board thickness direction.

TABLE 9

| Sample ID | Cell Size (microns) | | | | Cell Wall Thickness (microns) | Strut Equivalent Diameter (microns) |
|---|---|---|---|---|---|---|
| | x | y | z | average | | |
| 1 | 229 | 300 | 284 | 272 | 3.7 | 11.8 |
| A | 224 | 294 | 283 | 267 | 3.5 | 9.4 |

Figure 3:
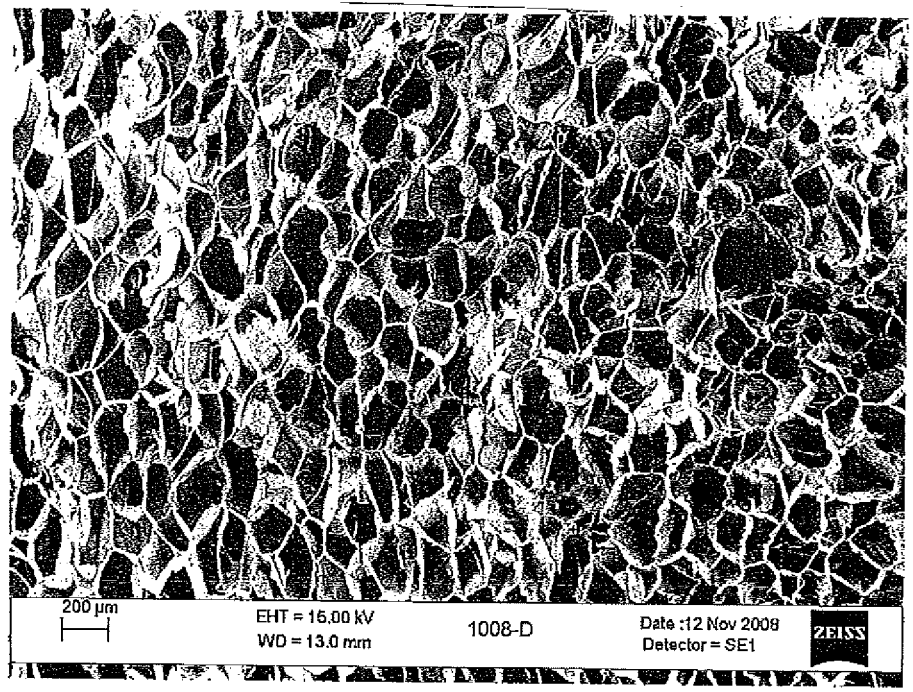
FIG. 3 is a scanning electron microscope (SEM) image of the cell morphology of a polystyrene foam containing 3% activated carbon, 0.4% $H_2O$ ($NaHCO_3$), and 4% $scCO_2$.

A typical cell structure of an extruded polystyrene foam with 3% AC, 0.4% $H_2O$ ($NaHCO_3$) and 4% $scCO_2$ had a cell wall of 2.1 microns, a strut of 9.2 microns, and an average cell size of 277 microns. The cell structure is depicted in FIG. 3.

Example 5

Samples were prepared following the procedures described in Example 4 utilizing a pre-water impregnated powder activated carbon (KB-G grade) and a polystyrene compound (PS/PAC25-SI) from Example 1. Table 10 shows the formulation and cell sizes.

TABLE 10

| | Formula | | | |
|---|---|---|---|---|
| Sample ID | PS wt % | PS/PAC25 -SI wt % | $scCO_2$ phh | Cell Size microns |
| I | 92 | 8 | 4 | 246 |
| L | 92 | 8 | 4 | 273 |

It was concluded that powdered activated carbon compound pre-impregnated with water was also an effective cell size enlarging agent and achieved a desired cell size using super critical carbon dioxide as the sole blowing agent. In addition, it was determined that a micro-porous activated carbon and polymer compound that was impregnated with water by either conditioning or steaming can be effectively fed into an extruder from a solid conveying zone into a primary extruder or into a melt-sealing section at the entry of the secondary extruder.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A rigid, extruded polymer foam board product comprising:
a composition comprising:
a polymer material comprising greater than about 95% by weight of polystyrene;
from about 2.5% to about 10% by weight of a blowing agent composition wherein the blowing agent composition comprises carbon dioxide present up to about 6.0 parts per hundred based on the weight of the polymer material; and from about 1% to about 5% by weight water-impregnated activated carbon having an average particle size from about 10 microns to about 30 microns;

wherein the water-impregnated activated carbon comprises an impregnated water content from about 0.2% to about 2% by weight of the polymer material;

wherein the rigid, extruded polymer foam board product comprises:

at least about 95% closed cells, an average density from about 1.5 lbs/ft$^3$ to about 5 lbs/ft$^3$, and a monomodal cell size distribution with an average cell size from about 250 microns to about 400 microns.

2. The rigid, extruded polymer foam board product of claim 1, wherein the impregnated water has been treated with a treatment selected from the group consisting of: a surfactant, an emulsifier, a wetting and penetrating agent, a neutralizer, a corrosion inhibitor, a chemical blowing agent, and combinations thereof.

3. The rigid, extruded polymer foam board product of claim 1, wherein the impregnated water has been treated with a neutralizer.

4. The rigid, extruded polymer foam board product of claim 3, wherein the neutralizer comprises sodium bicarbonate.

5. The rigid, extruded polymer foam board product of claim 1, wherein the blowing agent composition further comprises a hydrofluorocarbon.

6. The rigid, extruded polymer foam board product of claim 1, wherein the average density is from about 1.8 lbs/ft$^3$ to about 3 lbs/ft$^3$.

7. The rigid, extruded polymer foam board product of claim 1, wherein the rigid, extruded polymer foam board product has a change in dimension in any direction of no greater than 5 percent.

8. The rigid, extruded polymer foam board product of claim 1, wherein the activated carbon is non-encapsulated.

9. The rigid, extruded polymer foam board product of claim 1, wherein the rigid, extruded polymer foam board product has an average cell size from about 250 microns to about 300 microns.

10. A rigid, closed cell, extruded polymer foam product made from a composition comprising:

a polymer material comprising greater than about 95% by weight of polystyrene;

from about 2.5% to about 10% by weight of a blowing agent composition wherein the blowing agent composition comprises carbon dioxide present up to about 6.0 parts per hundred based on the weight of the polymer material; and from about 1% to about 5% by weight water-impregnated activated carbon having an average particle size from about 10 microns to about 30 microns; and wherein the water-impregnated activated carbon comprises an impregnated water content from about 0.2% to about 2% by weight of the polymer material;

wherein the impregnated water has been treated with a neutralizer comprising sodium bicarbonate; and wherein the rigid, closed cell, extruded polymer foam product has a monomodal cell size distribution with an average cell size from about 250 microns to about 400 microns.

11. The rigid, closed cell, extruded polymer foam product of claim 10, wherein the rigid, closed cell, extruded polymer foam board product has an average cell size from about 250 microns to about 300 microns.

12. The rigid, closed cell, extruded polymer foam product of claim 10, wherein the composition further comprises up to 2 weight % of an infrared attenuating agent based on the weight of the composition.

13. The rigid, closed cell, extruded polymer foam product of claim 10, wherein the composition further comprises up to 1 weight % of a nucleating agent based on the weight of the composition.

14. The rigid, closed cell, extruded polymer foam product of claim 10, wherein the composition further comprises up to 1 weight % of a fire retardant based on the weight of the composition.

15. A closed cell, extruded polymer foam board comprising:

a composition comprising:

a polymer material comprising greater than about 95% by weight of polystyrene;

from about 2.5% to about 10% by weight of a blowing agent composition wherein the blowing agent composition comprises carbon dioxide present up to about 6.0 parts per hundred based on the weight of the polymer material; and from about 1% to about 5% by weight water-impregnated activated carbon having an average particle size from about 10 microns to about 30 microns; and wherein the water-impregnated activated carbon comprises an impregnated water content from about 0.2% to about 2% by weight of the polymer material;

wherein the closed cell, extruded polymer foam board has a monomodal cell size distribution with an average cell size from about 250 microns to about 400 microns.

* * * * *